United States Patent [19]

Weissman

[11] 4,250,436

[45] Feb. 10, 1981

[54] MOTOR BRAKING ARRANGEMENT AND METHOD

[75] Inventor: Adrian Weissman, Jersey City, N.J.

[73] Assignee: The Singer Company, Stamford, Conn.

[21] Appl. No.: 78,333

[22] Filed: Sep. 24, 1979

[51] Int. Cl.³ .............................................. H02P 3/06
[52] U.S. Cl. .................................. 318/245; 318/365; 318/379; 318/247
[58] Field of Search ...................... 318/56, 60, 63, 88, 318/104, 111, 113, 245, 252, 258, 261, 269, 275, 364, 365, 377, 378, 493, 528, 536, 247, 262, 362, 374, 380, 381, 430, 446, 519, 520, 531, 532, 536, 537, 86, 104, 244, 273, 373, 375, 379

[56] References Cited

U.S. PATENT DOCUMENTS

| 2,930,957 | 3/1960 | Cronberger | 318/113 |
| 4,139,808 | 2/1979 | Matsumura | 318/374 |

Primary Examiner—Stanley J. Witkowski
Assistant Examiner—John W. Redman
Attorney, Agent, or Firm—David L. Davis; Robert E. Smith; Edward L. Bell

[57] ABSTRACT

A universal series motor having its brushes shifted at an angle against the direction of rotation is provided with a braking arrangement which removes power from the field windings and applies power directly to the armature winding.

7 Claims, 3 Drawing Figures

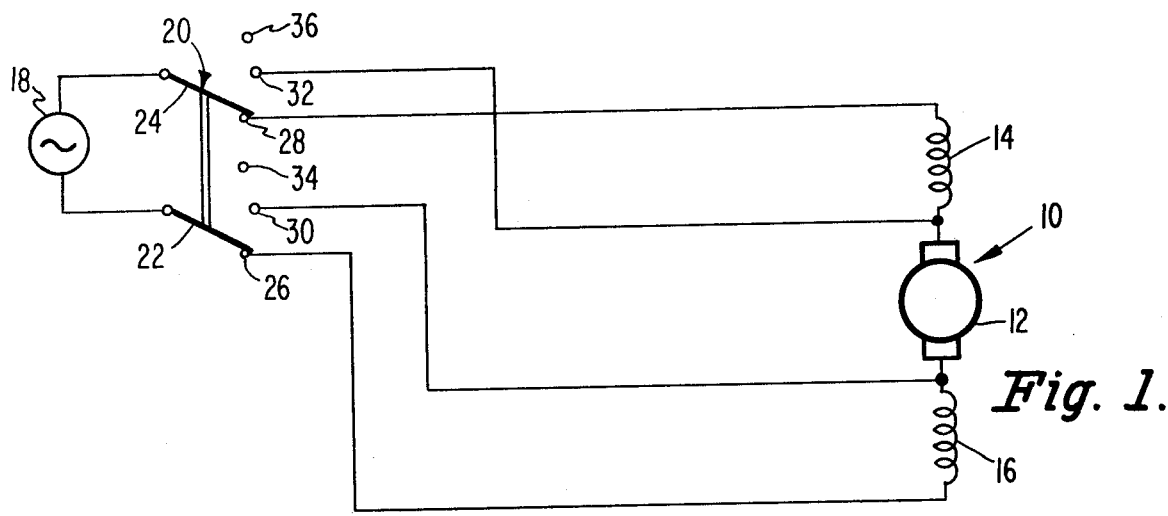
Fig. 1.
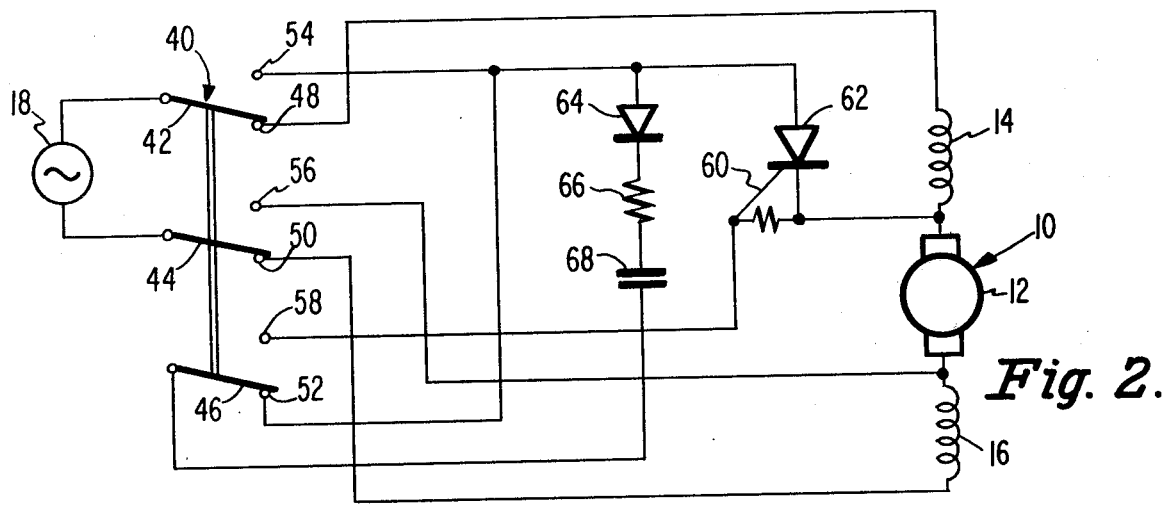
Fig. 2.
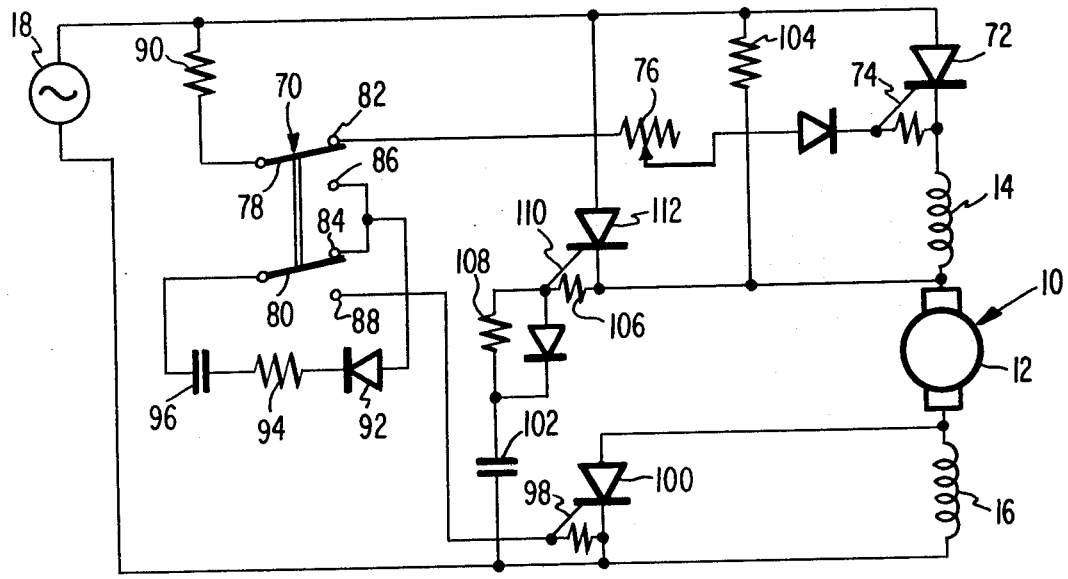

MOTOR BRAKING ARRANGEMENT AND METHOD

BACKGROUND OF THE INVENTION

This invention relates to motor control systems and, more particularly, to a braking arrangement and method for use with a universal series motor.

In such a motor, if the current passing through the armature maintaines its direction, but the field direction is reversed, a torque will be produced that will oppose the rotation. Thus, the motor can be braked by reversing the field coils. However, reversing the field coils to brake the motor posesses a number of disadvantages. It is therefor an object of this invention to brake a universal series motor without using the field coils.

To improve commutation of a universal series motor, it is common practice to shift the brushes anuglarly against the direction of rotation. This causes the production of a longitudinal component of armature reaction directed against the main field produced by the field coils. It would be desirable to be able to utilize this longitudinal component as a reverse field to provide braking torque to very quickly bring the motor to a stop.

It is therefore a primary object of this invention to provide an arrangement and method whereby the longitudinal component of the armature reaction is utilized to provide braking force for a universal series motor.

SUMMARY OF THE INVENTION

The foregoing and additional objects are attained in accordance with the principles of this invention in combination with a universal series motor connected to a source of electrical power by providing a method and an arrangement for utilizing the armature reaction to brake the motor. The arrangement operates in accordance with the method and comprises first disconnecting means for disconnecting the motor from the source, connecting means operative after the first disconnecting means has functioned for connecting the source directly to the armature winding of the motor, and second disconnecting means operative after the connecting means has functioned for disconnecting the source from the armature winding.

In accordance with an aspect of this invention, the second disconnecting means operates after the motor has stopped.

BRIEF DESCRIPTION OF THE DRAWINGS

The foregoing will be more readily apparent upon reading the following description in conjunction with the drawings wherein:

FIG. 1 is a schematic diagram including a universal series motor which is useful in understanding the principles of this invention;

FIG. 2 is a schematic circuit diagram of a first embodiment of an arrangement constructed in accordance with the principles of this invention; and, FIG. 3 is a schematic circuit diagram of a second embodiment of an arrangement constructed in accordance with the principles of this invention.

DETAILED DESCRIPTION

Referring now to the drawings wherein like elements in different figures thereof have the same reference character applied thereto, a universal series motor designated generally by the reference numeral 10 includes an armature winding 12 serially connected between field coil windings 14 and 16. Illustratively, as shown in FIG. 1, the motor 10 is connected to a source 18 of alternating current through a two pole-three position switch 20. It is understood that since the motor 10 is a universal motor, the source 18 alternatively could be a source of direct current. The switch 20 is shown in the position where the contact arms 22 and 24 contact the terminals 26 and 28, respectively, to apply the line voltage from the source 18 across both the field coils 14 and 16 and the armature winding 12 to effect running of the motor 10. When it is desired to brake the motor 10, the switch 20 is moved so that the contact arms 22 and 24 contact the terminals 30 and 32, respectively, to thereby first disconnect the motor 10 from the source 18 and subsequently connect the source 18 directly to the armature winding 12. With the elimination of the field coil reactance and resistance, the armature field increases and due to the longitudinal component of the armature reaction caused by the shifting of the brushes, the motor 10 will almost instantly be braked to a stop. At that time, the switch 20 is moved to its third position where the contact arms 22 and 24 are in contact with the terminals 34 and 36, respectively, to disconnect the source 18 from the armature winding 12.

Thus, the inventive method for braking the motor includes the steps of disconnecting the motor from the source, connecting the source directly to the motor armature winding, and then disconnecting the source from the armature winding. A suitable interval is provided before disconnecting the source from the armature winding to allow the motor to stop.

Referring now to FIG. 2, shown therein is a circuit diagram of a first embodiment of this invention wherein the motor 10 is connected to the source 18 through a three pole-two position switch 40. In the position of the switch 40 shown in FIG. 2, the contact arms 42, 44 and 46 contact the terminals 48, 50 and 52, respectively, so that the line voltage from the source 18 is applied through the terminals 48 and 50 across both the field windings 14 and 16 and the armature winding 12 of the motor 10, to effect a running condition for the motor 10. When the switch 40 is moved to its other position so that the contact arms 42, 44 and 46 contact the terminals 54, 56 and 58, respectively, during the positive half cycles of the source 18 line voltage, current is applied to the gate 60 of the SCR 62 through the diode 64, the resistor 66, the capacitor 68, the contact arm 46 and the terminal 58, turning on the SCR 62 to connect the armature winding 12 directly to the source 18, to effect braking of the motor 10. When the capacitor 68 becomes substantially fully charged, the current to the gate 60 stops and at the next zero crossing of the source 18 line voltage the SCR 62 turns off and disconnects the armature 12 from the source 18. The values of the resistor 66 and the capacitor 68 are chosen so that the SCR 62 turns off after the motor 10 stops.

Referring now to FIG. 3, shown therein is a schematic circuit diagram of a second embodiment of this invention wherein the motor 10 is connected to the source 18 through a two pole-two position switch 70. The arrangement as shown in FIG. 3 includes a motor speed controller having an SCR 72, wherein charging current is applied to the gate 74 thereof through a variable resistor 76 when the switch 70 is in the position shown in FIG. 3. In that position, the contact arms 78 and 80 contact the terminals 82 and 84, respectively, to supply firing current to the gate 74 of the SCR 72 through the terminal 82. When it is desired to stop the motor 10, the switch 70 is moved to the position where the contact arms 78 and 80 contact the terminals 86 and 88, respectively, to remove the firing current from the gate 74 of the SCR 72, thereby disconnecting the field windings 14 and 16 from the source 18. A path is provided from the source 18 through the resistor 90, the contact arm 78, the terminal 86, the diode 92, the resistor 94, the capacitor 96, the contact arm 80 and the terminal 88 to the gate 98 of the SCR 100, to thereby turn on the SCR 100. When the SCR 100 turns on, the capacitor 102, which previously had been charged from the source 18 through the resistors 104, 106 and 108, discharges into the gate 110 of the SCR 112, thereby turning on the SCR 112. With the SCR 100 and the SCR 112 conducting, the source 18 is connected directly to the armature 12 of the motor 10. When the capacitor 96 becomes fully charged, in the same manner as described hereinabove for the capacitor 68 in FIG. 2, the SCR 100 is turned off at the next zero crossing of the source 18 line voltage, thereby disconnecting the armature winding 12 from the source 18. As described above with respect to FIG. 2, the values of the resistor 94 and the capacitor 96 are chosen so that the SCR 100 is turned off after the motor 10 is stopped.

Accordingly, there has been disclosed a method and an improved arrangement for braking a universal series motor. It is understood that the above-described embodiments are merely illustrative of the application of the principles of this invention. Numerous other embodiments may be devised by those skilled in the art without departing from the spirit and scope of this invention, as defined by the appended claims. For example, circuitry could be provided to sense the actual stopping of the motor and this circuitry could take the place of the timing circuitry.

I claim:

1. A method for braking a universal series motor connected to a source of electrical power, said motor having its brushes angularly shifted against the direction of motor rotation, the method comprising the steps of:

(a) disconnecting the motor from the source;
   (b) connecting the source directly to the armature winding of the motor; and
   (c) disconnecting the source from the armature winding.

2. The method of claim 1 further including between steps (b) and (c) the step of:

(d) providing a time interval sufficient for the motor to stop.

3. In combination with a universal series motor connected to a source of electrical power, said motor having its brushes angularly shifted against the direction of motor rotation, an arrangement for braking said motor comprising:

first disconnecting means for disconnecting said motor from said source;
   connecting means operative after said first disconnecting means has functioned for connecting said source directly to the armature winding of the motor; and
   second disconnecting means operative after said connecting means has functioned for disconnecting said source from said armature winding.

4. The arrangement of claim 3 wherein said second disconnecting means includes delay means for delaying the disconnecting of said source from said armature winding until said motor has stopped.

5. The arrangement of claim 4 wherein said delay means includes means for timing a predetermined interval sufficient for said motor to stop.

6. The arrangement of claim 3 wherein said connecting means includes a switch having an open position and a closed position serially coupled between said armature winding and said source and a silicon controlled rectifier coupled between said switch and said armature winding and adapted to conduct when said switch is moved from said open position to said closed position.

7. The arrangement of claim 6 wherein said second disconnecting means includes circuit means responsive to said switch being moved from said open position to said closed position for turning off said silicon controlled rectifier after a predetermined time.

* * * * *